United States Patent
Willett, Jr. et al.

(10) Patent No.: US 9,587,511 B2
(45) Date of Patent: Mar. 7, 2017

(54) TURBOMACHINE COLD CLEARANCE ADJUSTMENT

(71) Applicant: General Electric Company, Schenectady, NY (US)

(72) Inventors: Fred Thomas Willett, Jr., Burnt Hills, NY (US); Kenneth Michael Koza, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 647 days.

(21) Appl. No.: 14/105,834

(22) Filed: Dec. 13, 2013

(65) Prior Publication Data
US 2015/0167487 A1    Jun. 18, 2015

(51) Int. Cl.
| F01D 11/22 | (2006.01) |
| F01D 21/00 | (2006.01) |
| F01D 25/24 | (2006.01) |
| G01B 7/14 | (2006.01) |
| G01B 11/14 | (2006.01) |

(52) U.S. Cl.
CPC .......... *F01D 21/003* (2013.01); *F01D 25/24* (2013.01); *G01B 7/14* (2013.01); *G01B 11/14* (2013.01); *F05D 2230/644* (2013.01); *F05D 2260/80* (2013.01); *F05D 2270/804* (2013.01); *F05D 2270/821* (2013.01); *Y10T 29/49323* (2015.01)

(58) Field of Classification Search
CPC .......... F01D 11/14; F01D 11/16; F01D 11/20; F01D 11/22
See application file for complete search history.

(56) References Cited

U.S. PATENT DOCUMENTS

| 4,395,827 | A | * | 8/1983 | Stowe | F01D 11/08 33/613 |
| 4,813,273 | A | | 3/1989 | Parsons | |
| 4,818,948 | A | | 4/1989 | Dooley | |
| 5,140,494 | A | | 8/1992 | Slade | |
| 5,203,673 | A | * | 4/1993 | Evans | F01D 11/22 415/10 |
| 5,319,922 | A | | 6/1994 | Brantley | |
| 5,385,013 | A | | 1/1995 | Barron et al. | |

(Continued)

FOREIGN PATENT DOCUMENTS

| CH | EP 2821593 A1 * 1/2015 ............... F01D 5/28 |

*Primary Examiner* — Woody Lee, Jr.
(74) *Attorney, Agent, or Firm* — Ernest G. Cusick; Hoffman Warnick LLC

(57) ABSTRACT

A system and method for measuring and adjusting rotor to stator clearances is disclosed, as well as a turbomachine embodying the system and method. In an embodiment, a turbomachine is assembled, including a stator having an upper and a lower stator shell, and a rotor disposed within the stator. A cold clearance between the rotor and the stator is determined at each of a plurality of clearance measurement points using an in situ clearance sensor system. Each of the clearance measurement points is axially spaced from each other clearance measurement point. The cold clearance between the rotor and the stator is adjusted based on the determined cold clearances, by displacing one of the upper stator shell or the lower stator shell relative to a foundation, thereby changing a shape of the upper stator shell or the lower stator shell to accommodate a position of the rotor within the stator.

18 Claims, 14 Drawing Sheets

(56) References Cited

U.S. PATENT DOCUMENTS

| | | |
|---|---|---|
| 5,513,539 A | 5/1996 | McLaughlin et al. |
| 5,545,007 A * | 8/1996 | Martin .................... F01D 11/22 |
| | | 415/118 |
| 6,575,011 B1 | 6/2003 | Busby et al. |
| 6,717,418 B2 | 4/2004 | Orenstein |
| 7,180,305 B2 | 2/2007 | Andarawis et al. |
| 7,215,129 B1 | 5/2007 | Andarawis et al. |
| 7,332,915 B2 | 2/2008 | Andarawis et al. |
| 7,333,913 B2 | 2/2008 | Andarawis et al. |
| 7,404,331 B2 | 7/2008 | Ruud et al. |
| 7,466,143 B2 | 12/2008 | Andarawis et al. |
| 7,540,704 B2 | 6/2009 | Shang et al. |
| 7,652,489 B2 | 1/2010 | Dasgupta et al. |
| 7,688,081 B2 | 3/2010 | Webster |
| 7,722,310 B2 | 5/2010 | Balasubramaniam et al. |
| 7,775,107 B2 | 8/2010 | Holmquist |
| 7,785,063 B2 | 8/2010 | McQuiggan et al. |
| 7,852,092 B2 | 12/2010 | Andarawis et al. |
| 7,853,427 B2 | 12/2010 | Chan et al. |
| 2006/0239813 A1 | 10/2006 | Shah et al. |
| 2009/0003991 A1 | 1/2009 | Andarawis et al. |
| 2009/0243628 A1 | 10/2009 | Andarawis |
| 2010/0077830 A1 | 4/2010 | Andarawis et al. |
| 2010/0188100 A1 | 7/2010 | Andarawis et al. |
| 2010/0191502 A1 | 7/2010 | Ren et al. |
| 2010/0303612 A1* | 12/2010 | Bhatnagar ............... F01D 11/22 |
| | | 415/127 |
| 2012/0114470 A1* | 5/2012 | Burdgick ................ F01D 9/047 |
| | | 415/201 |
| 2012/0121391 A1* | 5/2012 | Burdgick ............. F01D 25/243 |
| | | 415/148 |
| 2013/0039743 A1 | 2/2013 | Willett, Jr. |
| 2013/0073172 A1* | 3/2013 | Worden ................ G01H 1/003 |
| | | 701/101 |

* cited by examiner

TURBOMACHINE COLD CLEARANCE ADJUSTMENT

BACKGROUND OF THE INVENTION

The disclosure relates generally to turbomachines such as steam and gas turbines, and more particularly, to a system and method for adjusting cold clearances between rotating turbine blade tips and their surrounding casing in situ.

Turbomachines, such as gas and steam turbines, typically include a centrally-disposed rotor that rotates within a stator. A working fluid flows through one or more rows of circumferentially arranged rotating blades that extend radially outwardly from the rotor shaft. The fluid imparts energy to the shaft, which is used to drive a load such as an electric generator or compressor.

Tight seal clearances between radially outer tips of the rotating blades and stationary shrouds on an interior of the stator are necessary for maximally efficient operation of the turbomachine. The smaller the clearance between the rotor blades and the inner surface of the stator, the lower the likelihood of fluid leakage across blade tips. Such fluid leakages may cause fluid to bypass a stage of blades, thereby reducing efficiency.

Differing operating conditions may cause blades and other components to experience thermal expansion, which may result in variations in blade tip clearance. The specific effects of various operating conditions on blade clearance may vary depending on the type and design of a particular turbomachine. For example, tip clearances in gas turbine compressors may reach their nadir values when the turbine is shut down and cooled, whereas tip clearances in low pressure steam turbines may reach their nadir values during steady state full load operation. Proper seal clearance during turbine operation depends on proper adjustment of cold seal clearance during turbomachine assembly, and control of the relative rotor and stator positions.

One method of adjusting relative rotor and stator positions, and therefore the relevant clearances, is the performance of iterative tops-off and tops-on clearance measurements and adjustments. During turbine assembly or re-assembly, the lower stator shell may be assembled first, followed by placing the rotor. Although rotor-to-stator clearances can be measured in the lower half prior to assembling the upper half (i.e., in the "tops-off" condition), these values may not be directly representative of the values in the fully assembled turbine (i.e., in "tops-on" condition) because the turbine shell is supported differently when the upper shell of the stator is affixed to the lower shell. In the tops-on condition, support may be shifted from the lower shell arm to the upper shell arms, the weight of the upper shell of the stator is added, and when the horizontal joint is bolted, the overall stator structure stiffens. As a result of these and other changes, the rotor-to-stator clearance may be different in the tops-on and tops-off conditions, by a factor which may not be readily predictable. Often, multiple iterations are performed, in which the upper stator shell is disassembled and reassembled in an adjusted position based on the differences in tops-on and tops-off clearances.

BRIEF DESCRIPTION OF THE INVENTION

A first aspect of the disclosure provides a turbomachine comprising: a rotor having a plurality of blade stages, a stator surrounding the rotor, the stator including a lower stator shell and an upper stator shell, and an in situ clearance sensor system for determining a cold clearance between the rotor and the stator at each of a plurality of clearance measurement points. Each of the plurality of clearance measurement points is disposed at a position axially spaced from each other clearance measurement point. A plurality of displacement adjustment devices are axially spaced from one another along the stator, for displacing a position of one of the upper stator shell or the lower stator shell relative to a foundation and adjusting the cold clearance between the rotor and the stator based on the clearance determined by the in situ clearance sensor system.

A second aspect of the disclosure provides a method for adjusting rotor-to-stator clearances comprising: assembling a turbomachine including a stator having a lower stator shell and an upper stator shell, and a rotor disposed within the stator; determining a cold clearance between the rotor and the stator at each of a plurality of clearance measurement points using an in situ clearance sensor system, wherein each of the clearance measurement points is axially spaced from each other clearance measurement point; and adjusting the cold clearance between the rotor and the stator at each of the plurality of clearance measurement points based on the determined cold clearances. The adjusting includes changing a shape of the upper stator shell or the lower stator shell by displacing one of the upper stator shell or the lower stator shell relative to a foundation to accommodate a position of the rotor within the stator.

A third aspect of the disclosure provides a system for adjusting a rotor-to-stator clearance in a turbomachine, the system comprising: an in situ clearance sensor system for determining a cold clearance between a rotor and a stator at each of a plurality of clearance measurement points, the stator including a lower stator shell and an upper stator shell, and the rotor being disposed within the stator, wherein the in situ clearance sensor system includes at least one voltage drop sensor inserted into one of the lower stator shell or the upper stator shell at a clearance measurement point, for measuring a voltage drop across a clearance between a tip of the voltage drop sensor and a rotor blade tip, and a computing device in signal communication with the voltage drop sensor. The computing device includes a processor and a memory, the memory including instructions which when executed by the computing device, cause the computing device to determine a clearance between the rotor and the stator based on a signal representing the voltage drop. The system further includes a displacement adjustment device disposed along the stator, for displacing a position of one of the upper stator shell or the lower stator shell relative to a foundation and based on the determined clearance between the rotor and the stator, thereby adjusting the cold clearance between the rotor and the stator to a desired distance.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a turbomachine in the form of a steam turbine. Although some embodiments of the invention are illustrated in the form of a steam turbine, it is understood that the teachings are equally applicable to other turbomachines, including but not limited to gas turbines. Further, at least one embodiment of the present invention is described below in reference to a nominal size and including a set of nominal dimensions. It should be apparent to those skilled in the art that the present invention is likewise applicable to any suitable turbine and/or generator. Further, it should be apparent to those skilled in the art that the present invention is likewise applicable to various scales of the nominal size and/or nominal dimensions.

As indicated above, FIGS. 1-14 depict, and aspects of the invention provide, a system and method for adjusting rotor-to-stator clearances, as well as a turbomachine embodying aspects of such a system.

Figure 1:
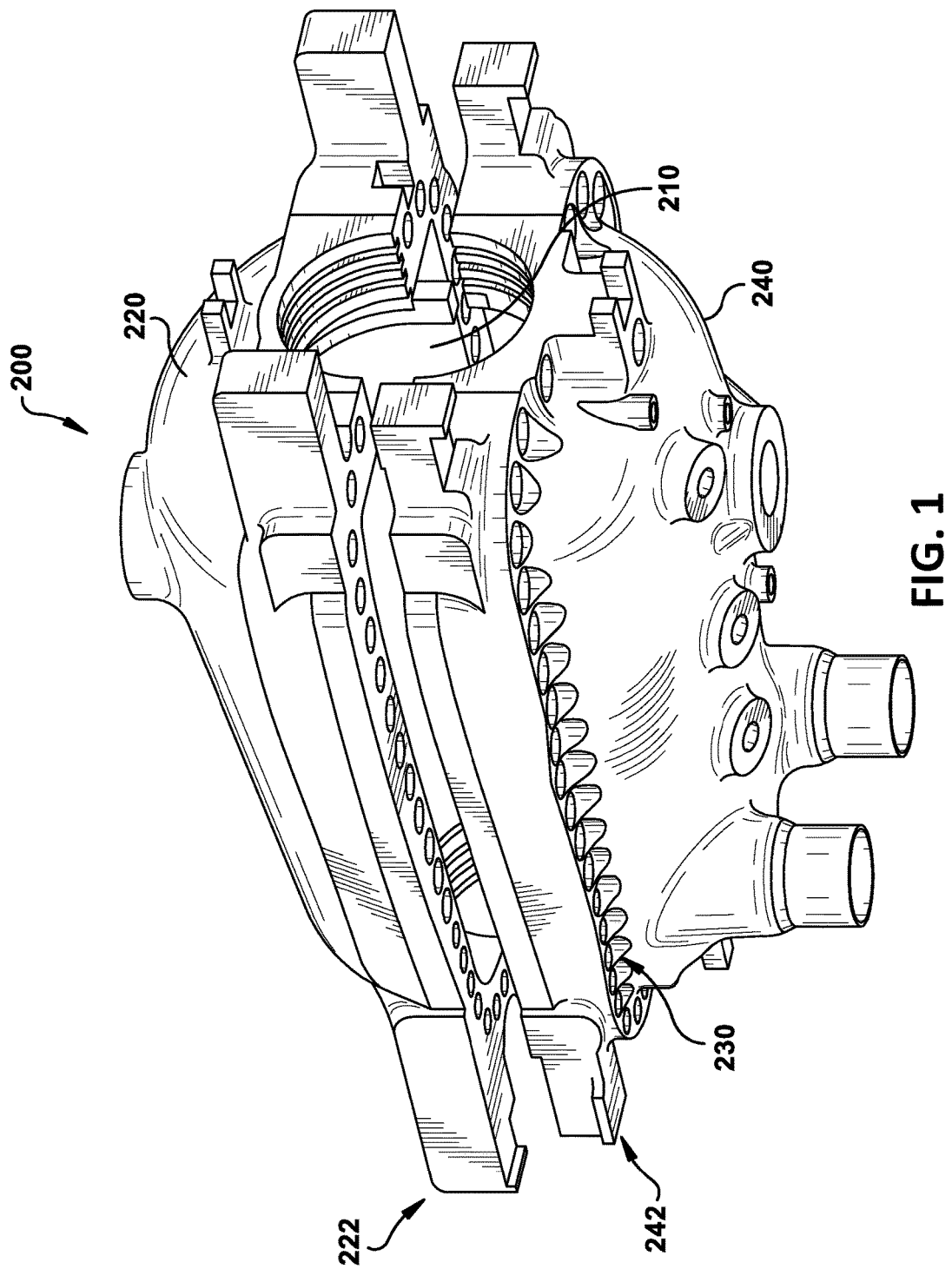
FIG. 1 shows an exploded perspective view of an upper and lower shell of a stator.
Figure 2:
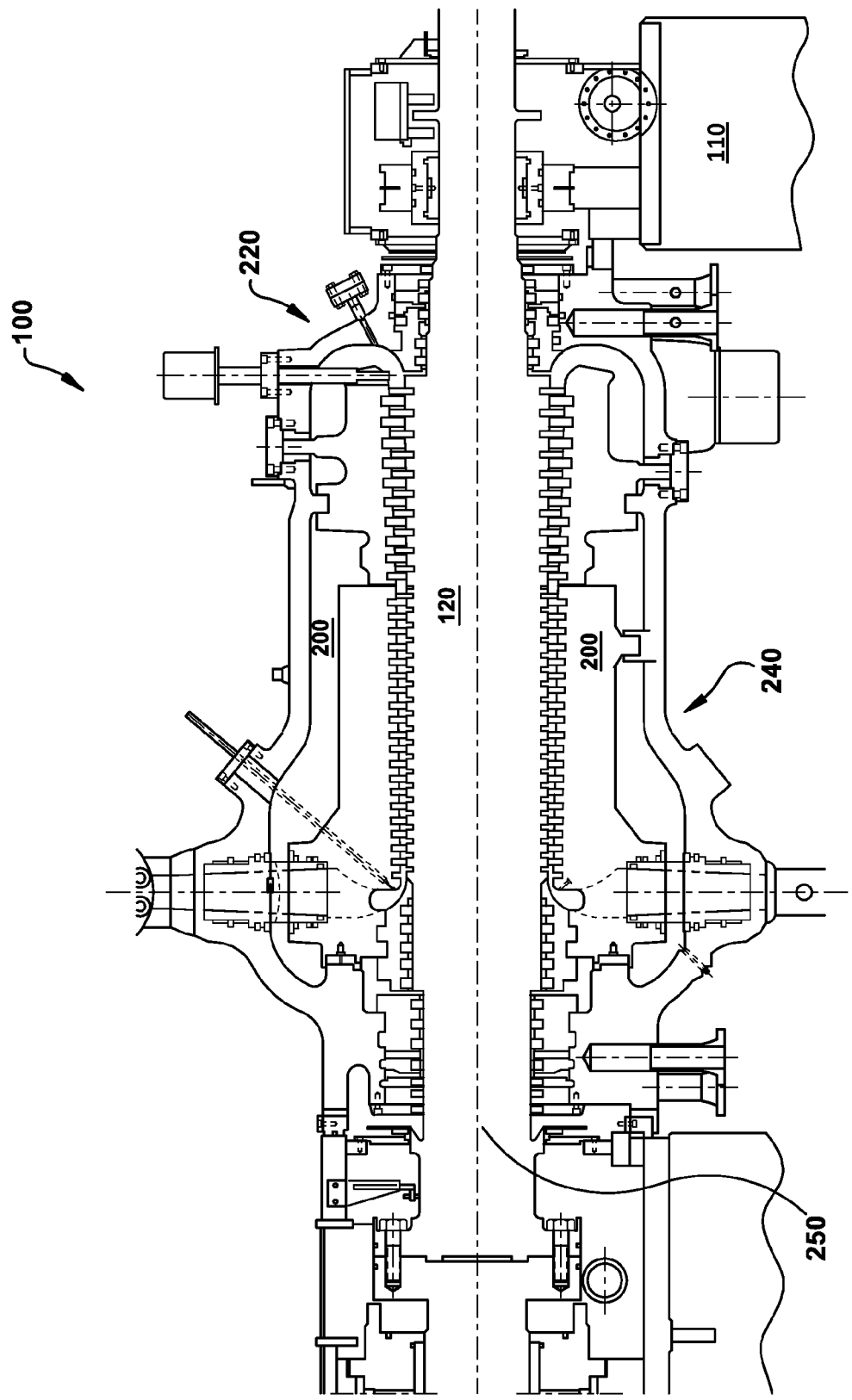
FIG. 2 shows a cross sectional schematic view of a turbomachine.
Figure 3:
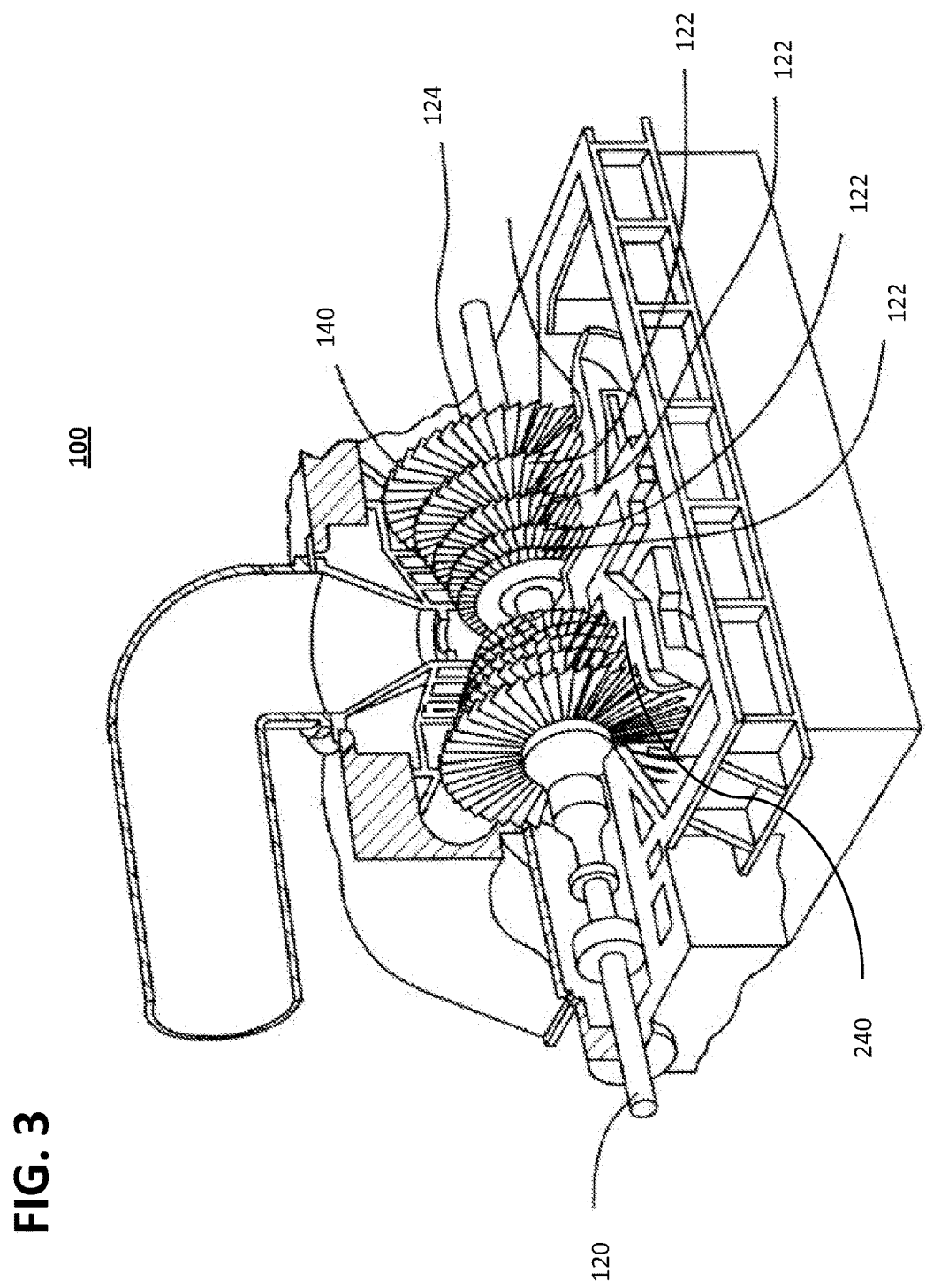
FIG. 3 shows a perspective partial cut-away illustration of a steam turbine.
Figure 4:
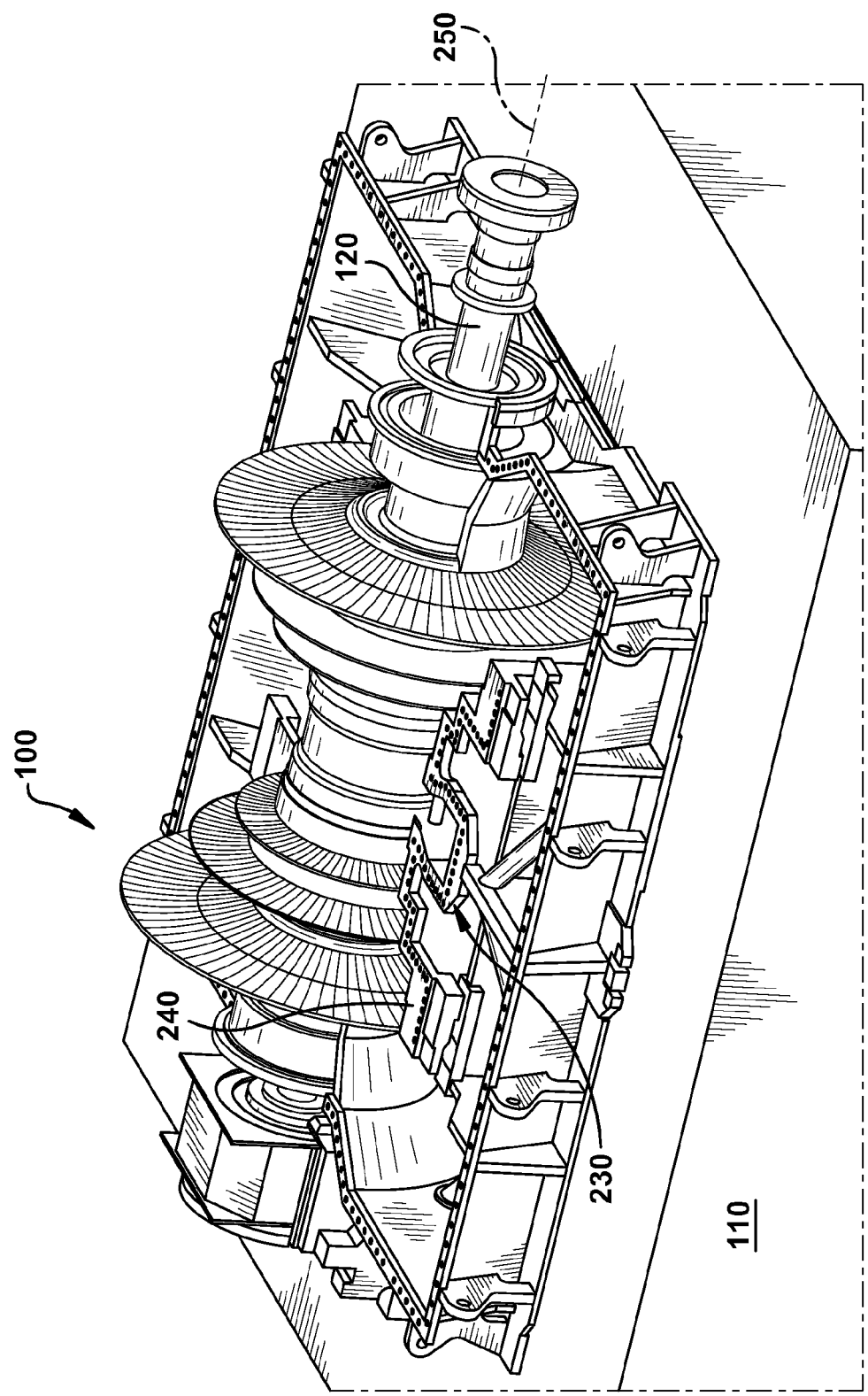
FIG. 4 shows a perspective illustration of a turbomachine in the tops-off condition in accordance with an embodiment of the invention.

FIGS. 1-3 show different aspects of turbine 100 (labeled in FIG. 2) in accordance with embodiments of the disclosure. FIG. 1 shows an exploded perspective view of an outer shell of stator 200, which includes upper stator shell 220 and lower stator shell 240. Upper stator shell 220 includes an upper stator shell arm 222; lower stator shell 240 likewise includes lower stator shell arm 242. As shown in FIG. 2, stator 200 surrounds rotor 120, which rotates about a longitudinal axis 250 within stator 200. As is known in the art, rotor 120 may carry a plurality of stages of blades 140 (FIG. 3). As further shown in FIG. 2, turbine 100 may further be assembled to a foundation 110.

Turbine 100 may be assembled by first assembling lower stator shell 240 (FIGS. 2-5) and foundation 110 (FIGS. 2 and 4-5), followed by assembling rotor 120 (FIGS. 2-5). This is referred to as the "tops-off" condition, shown in FIG. 4, where lower stator shell 240 and rotor are assembled, but the upper stator shell 220 is not yet assembled. At this point, rotor to lower stator shell 240 clearances can be measured, but these values are not directly representative of the values in the fully assembled turbine (i.e., in "tops-on" condition, see FIG. 5). Upper stator shell 220 may then be assembled to lower stator shell 240 (i.e., the "tops-on" condition, see FIG. 5). In some turbine designs, particularly some high and intermediate pressure turbines, when transitioning from the tops-off condition to the tops-on condition during assembly, structural support for turbine 100 shifts from lower shell arm 242 (FIG. 1) to upper shell arm 222 (FIG. 1), and the weight of the upper shell 220 of the stator is added. In the more general case, when upper stator shell 220 and lower stator shell 240 are bolted together at horizontal joint 230 (FIG. 5), the overall stator 200 structure (FIG. 1) stiffens. As a result of these and other changes, the rotor-to-stator clearance may be different in the tops-on and tops-off conditions, by a factor which may not be readily predictable.

Figure 6:
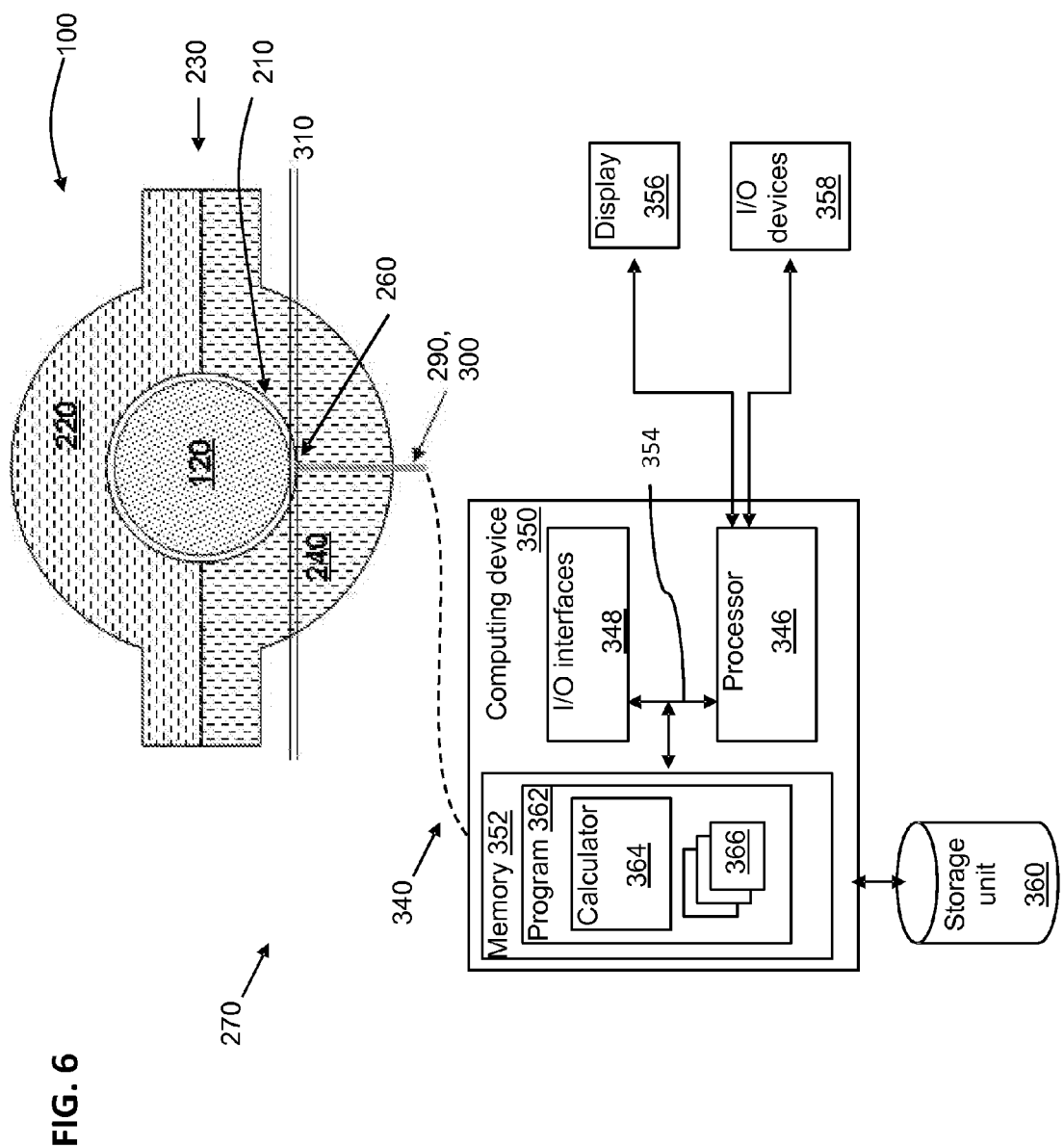
FIG. 6 shows a schematic illustration of a system for adjusting rotor-to-stator clearances in a turbomachine in accordance with an embodiment of the invention.
Figure 7:
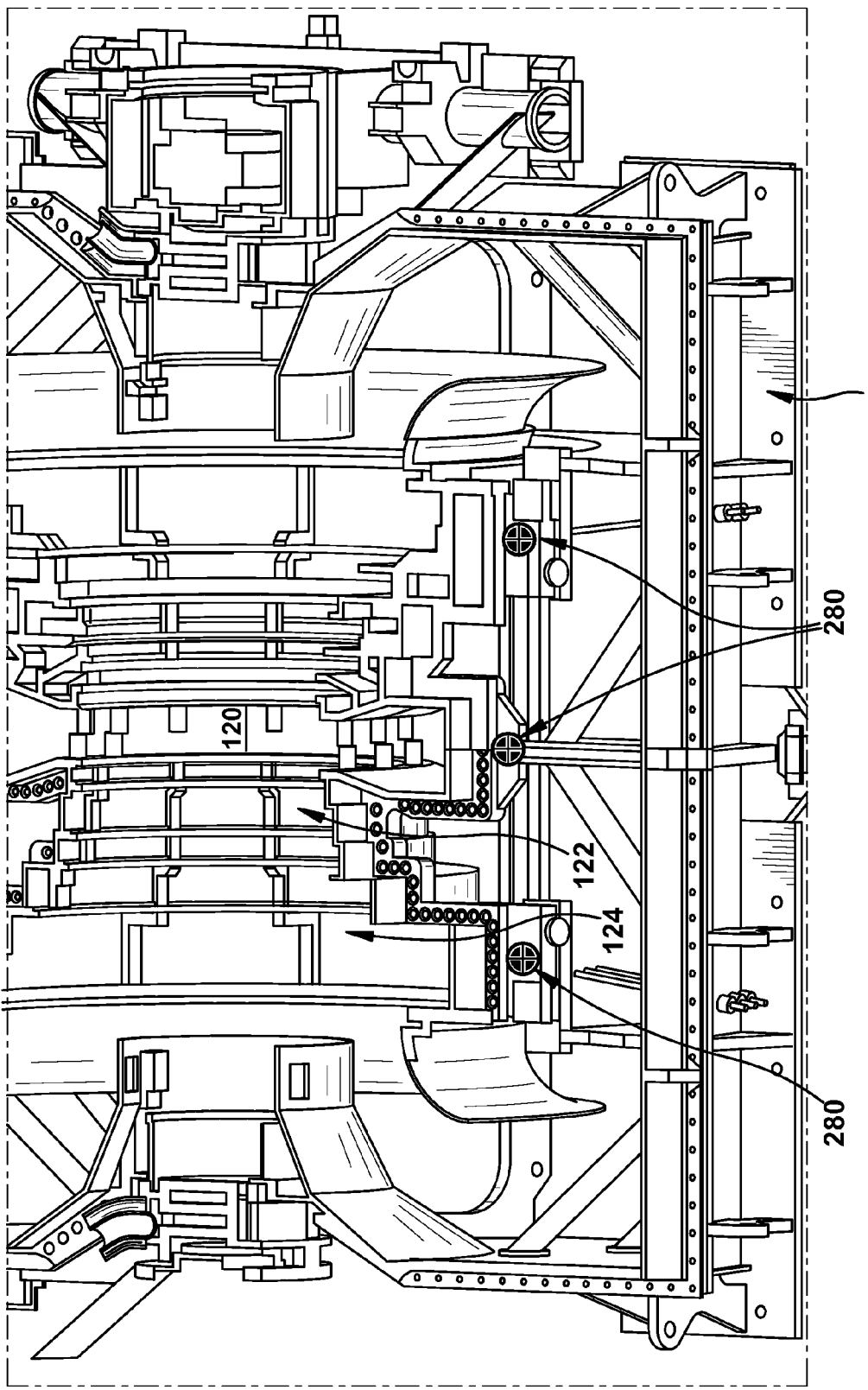
FIG. 7 shows a perspective partial cutaway view of a turbomachine in accordance with an embodiment of the invention.
Figure 8:
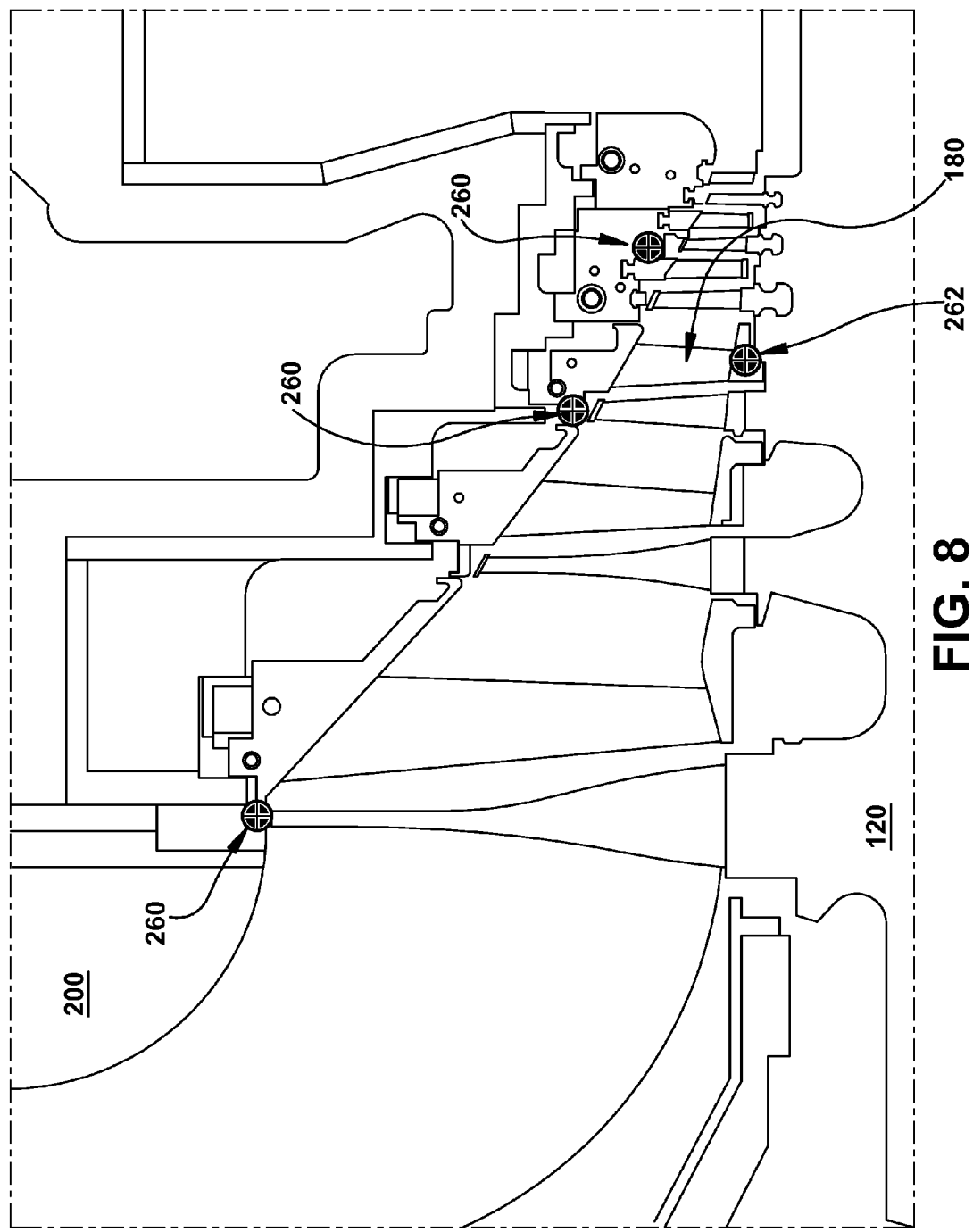
FIG. 8 shows a cross sectional view of a turbomachine in accordance with an embodiment of the invention.

As shown in FIG. 6, an in situ clearance sensor system 270 may be provided for determining a cold clearance 310 between rotor 120 and an inner surface 210 of stator 200 at each of a plurality of clearance measurement points 260 or 262 (FIG. 8). Cold clearances 310 may be measured either at clearance measurement points 260 at the tips of blades 140 or at the roots of nozzles 180 at clearance measurement points 262. Each of the plurality of clearance measurement points 260, 262 may be disposed at a position that is axially spaced from each other clearance measurement point 260, 262. In various embodiments, between two and five axially spaced clearance measurement points 260, 262 may be provided. For example, in the embodiment shown in FIG. 8, three axially spaced clearance measurement points 260, and one clearance measurement point 262 are provided.

Figure 9:
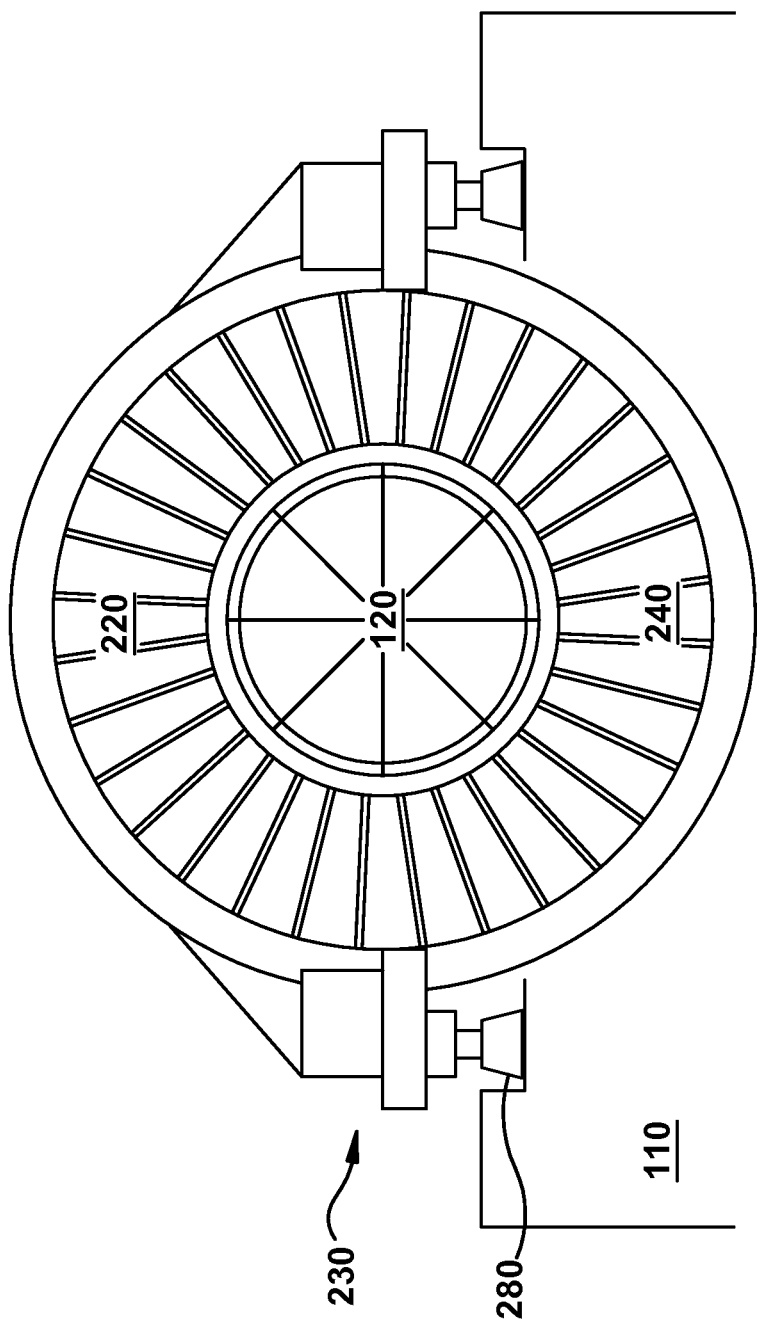
FIG. 9 is a cross sectional view of a turbomachine including a displacement adjustment device taken perpendicular to the axis of rotation of the rotor, in accordance with an embodiment of the invention.
Figure 10:
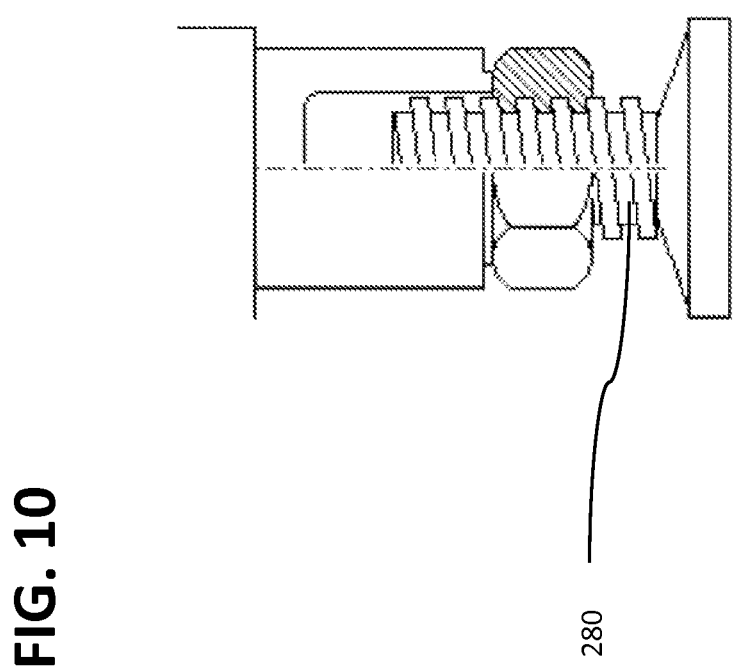
FIG. 10 is a partial cutaway view of a displacement adjustment device in accordance with an embodiment of the invention.

A plurality of displacement adjustment devices 280 (FIGS. 7, 9) are provided for displacing a position of one of either upper stator shell 220 or lower stator shell 240, relative to foundation 110, based on the clearance 310 as shown in FIG. 6, and as determined by in situ clearance sensor system 270 (FIG. 6). In some embodiments, the plurality of displacement adjustment devices 280 may be disposed at horizontal joint 230 between upper stator shell 220 and lower stator shell 240 (FIG. 9). In particular, displacement adjustment devices 280 may provide for vertical movement of upper or lower stator shell 220, 240. As upper or lower stator shell 220, 240 is vertically displaced, the upper or lower stator shell 220, 240 may deform elastically to match the installed position of rotor 120. Displacement adjustment devices 280 may be substantially axially aligned with clearance measurement points 260, 262, but may not be in various embodiments. In embodiments where, for example, a clearance measurement point 260, 262 is axially positioned between two displacement adjustment devices 280, the displacement adjustment devices 280 may be adjusted, thereby changing the clearance 310 (FIG. 6) at the clearance measurement point 260, 262. In some embodiments, displacement adjustment device 280 may be one of a jacking screw (FIG. 10), a set screw, a fixator, a hydraulic cylinder, or a pneumatic cylinder. In further embodiments, displacement adjustment device 280 may be locked once in its final position by, e.g., an epoxy or cement, or in the case of a hydraulic or pneumatic cylinder, a valve for locking the position of the displacement adjustment device 280.

Referring back to FIG. 6, in situ clearance sensor system 270 may include a sensing or measuring device located at or near each of the clearance measurement points 260, 262 (FIG. 8). The type of sensing or measuring device may depend in part on the environment within turbine 100 near a particular clearance measurement point 260, 262.

Figure 11:
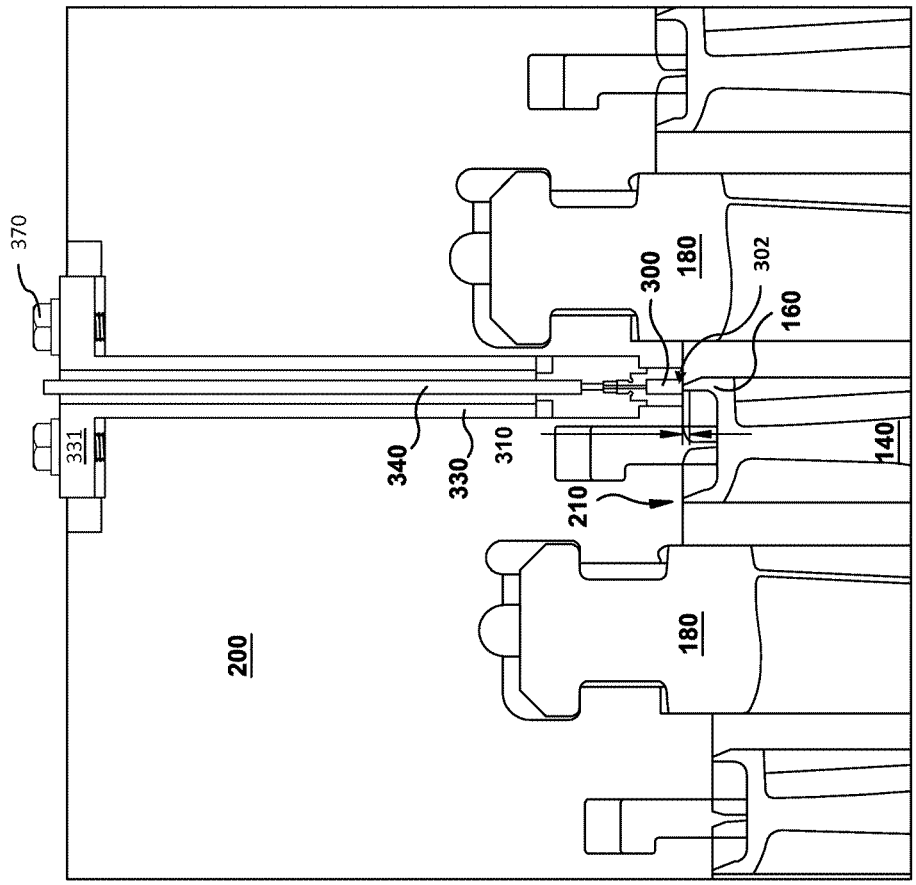
FIGS. 11-12 show cross sectional views of a voltage drop sensor and a clearance sensor retainer member in accordance with an embodiment of the invention.

At least one clearance sensor may be inserted into either lower stator shell 240 (as in FIG. 6) or upper stator shell 220, such that it is substantially axially aligned with a clearance measurement point 260 (FIG. 8). In one embodiment, a voltage drop sensor 300 may be used to measure a voltage drop across a clearance 310 (FIG. 6) between a tip 302 of voltage drop sensor 300 (FIG. 11) and the tip of rotor blade 140 (FIG. 3). As shown in FIG. 11, the radially outermost point on rotor 120 blade 140 may be a blade seal tooth tip 160. Other types of sensors, either now known or later developed, may also be used.

Figure 12:
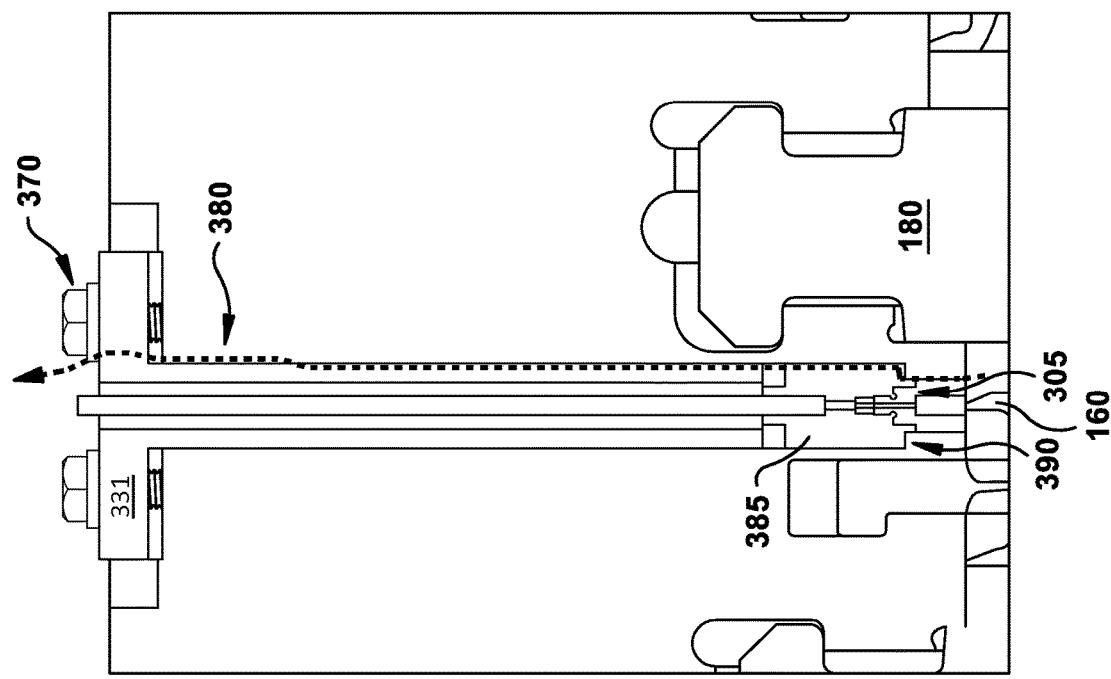

Voltage drop sensor 300 may be used where a particular clearance measurement point 260, 262 (FIG. 8) is axially aligned with the rotor blade 140 tip of one of the dry, or upstream stages 122 of blades 140 (FIG. 3). Voltage drop sensor 300 may be positioned in the upper 220 or lower shell 240 (FIG. 6) of stator 200 such that the tip 302 (FIG. 10) of sensor 300 is located substantially inboard of the outer surface of the turbine shell when sensor 300 is installed. Tip 302 of sensor 300 may be either substantially flush with the inner surface 210 of stator 200 or slightly recessed from the inner surface 210 of stator 200 (FIG. 12). More than one voltage drop sensor 300 may be provided, if more than one clearance measurement point 260, 262 is axially aligned with an upstream stage 122 of blades 140 (FIG. 3). In various embodiments, a plurality of voltage drop sensors 300 may be provided in a plurality of upstream stages 122 of blades 140.

As further shown in FIG. 11, voltage drop sensor 300 may be mounted to stator 200 and held in place by means of sensor retainer member 330. Sensor retainer member 330 may be substantially tube-shaped, with a passageway therein for clearance sensor instrumentation leads 340, and a flange member 331 at a radially outward end relative to turbine 100. In some embodiments, sensor retainer member 330 may comprise a single member; in other embodiments sensor retainer member 330 may comprise two separate members, each including a semi-annular portion and portion of flange member 331 such that they can be inserted into stator 200 separately and joined together to position voltage drop sensor 300 and contain clearance sensor instrumentation leads 340. Bolts 370 may be used to affix flange member 331 of sensor retainer 330 to stator 200.

In order to avoid a potential steam leakage path 380 along sensor retainer member 330, shown in FIG. 12, voltage drop sensor 300 may be either permanently affixed in a manner that fully seals the interface (e.g., welded, brazed, cemented, etc.) or may be installed with enough contact surface area and contact force so as to prevent leakage along path 380. In the embodiment shown in FIG. 12, substantially annularly shaped sealing member 385 includes surface 390, which acts as a sealing surface. Surface 390 is a substantially annularly shaped surface at the distal end, i.e., the end nearer voltage drop sensor 300.

Figure 5:
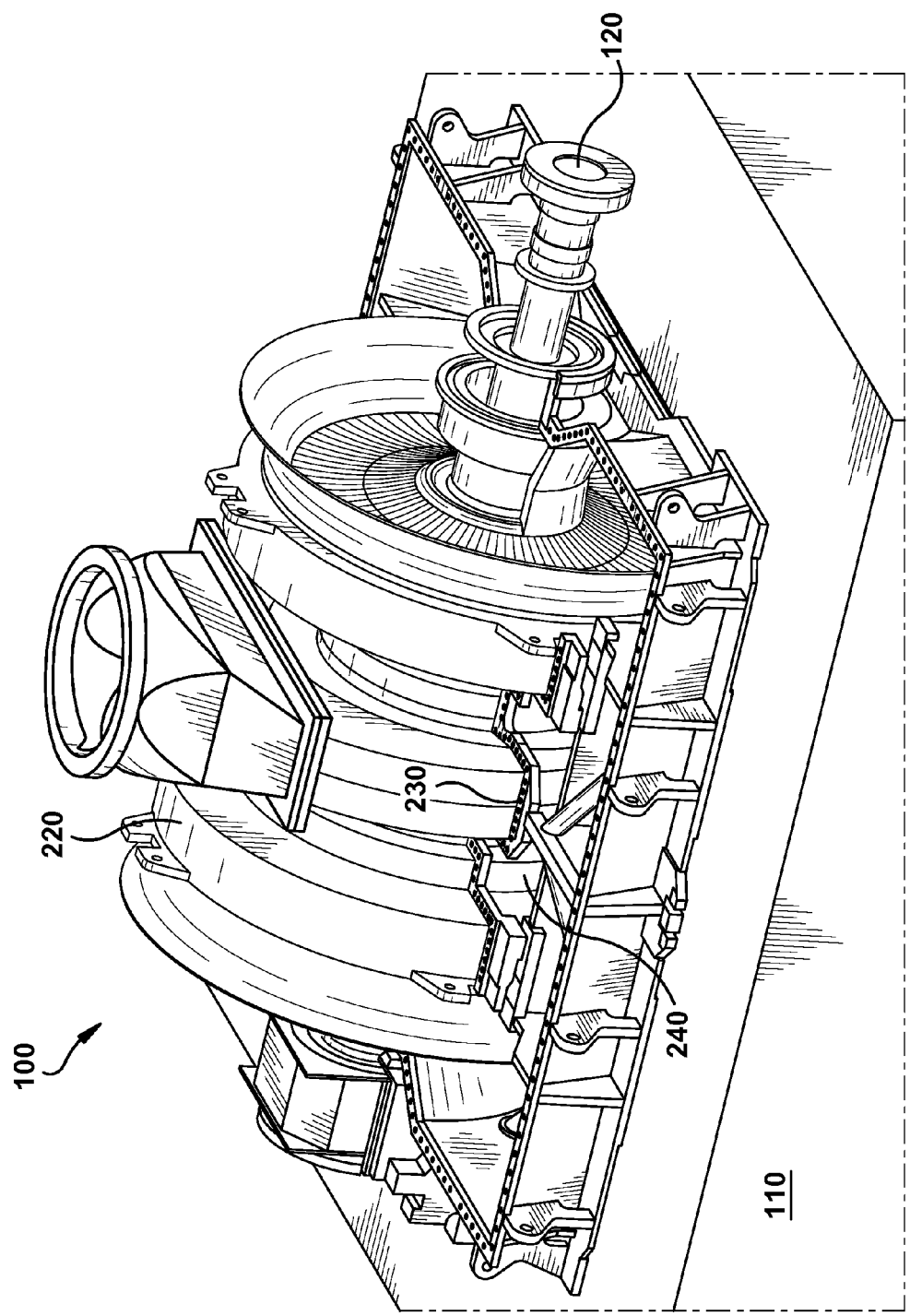
FIG. 5 shows a perspective illustration of a turbomachine in the tops-on condition in accordance with an embodiment of the invention.

As shown in FIG. 12, proximal end 305 of voltage drop sensor 300 mates with a surface 390, and the surfaces are forced together to prevent leakage of working fluid in turbine 100 (FIGS. 2, 5). Retainer member 330 and the bolts 370 or other methods of affixation provide the force necessary to ensure a proper seal. Force may also be applied using other types of springs or fluid systems, e.g., hydraulic or pneumatic. Gaskets or other sealing devices may also be used to provide a seal.

In embodiments in which turbine 100 (FIGS. 2, 5) is single-shell construction, the voltage drop sensor 300 may be embedded in the shell, the nozzle ring, or in a nozzle cover such that it reads directly on rotor 120. In either case, the voltage drop sensor 300 and related hardware (including, e.g., sensor retainer member 330) would penetrate the shell. In embodiments in which turbine 100 has double-shell construction, the voltage drop sensor 300 could be embedded in the inner shell (or nozzle carrier) or in a nozzle outer ring. In such an embodiment, the inner shell would be penetrated by the voltage drop sensor 300 and related hardware, and clearance sensor instrumentation leads 340 would exit turbine 100 (FIGS. 2, 5) through an instrumentation port in the outer shell.

In addition to voltage drop sensor 300, in situ clearance sensor system 270 (FIG. 6) may further include a laser measurement device 290 removably affixed to a rotor blade 140 tip on a final stage of blades 124 (FIG. 3). Shown in FIG. 13, laser measurement device 290 may be configured to measure a tops-on clearance between the tip of rotor blade 140 and the inner surface 210 of stator 200 in a wet, final stage 124 of blades 140 (FIG. 3) while the upper stator shell 220, rotor 120, and lower stator shell 240 (FIGS. 6 and 9) are assembled together. In some embodiments, laser measurement device 290 may be removable, and may in particular be removed from turbine 100 prior to operation.

Figure 13:
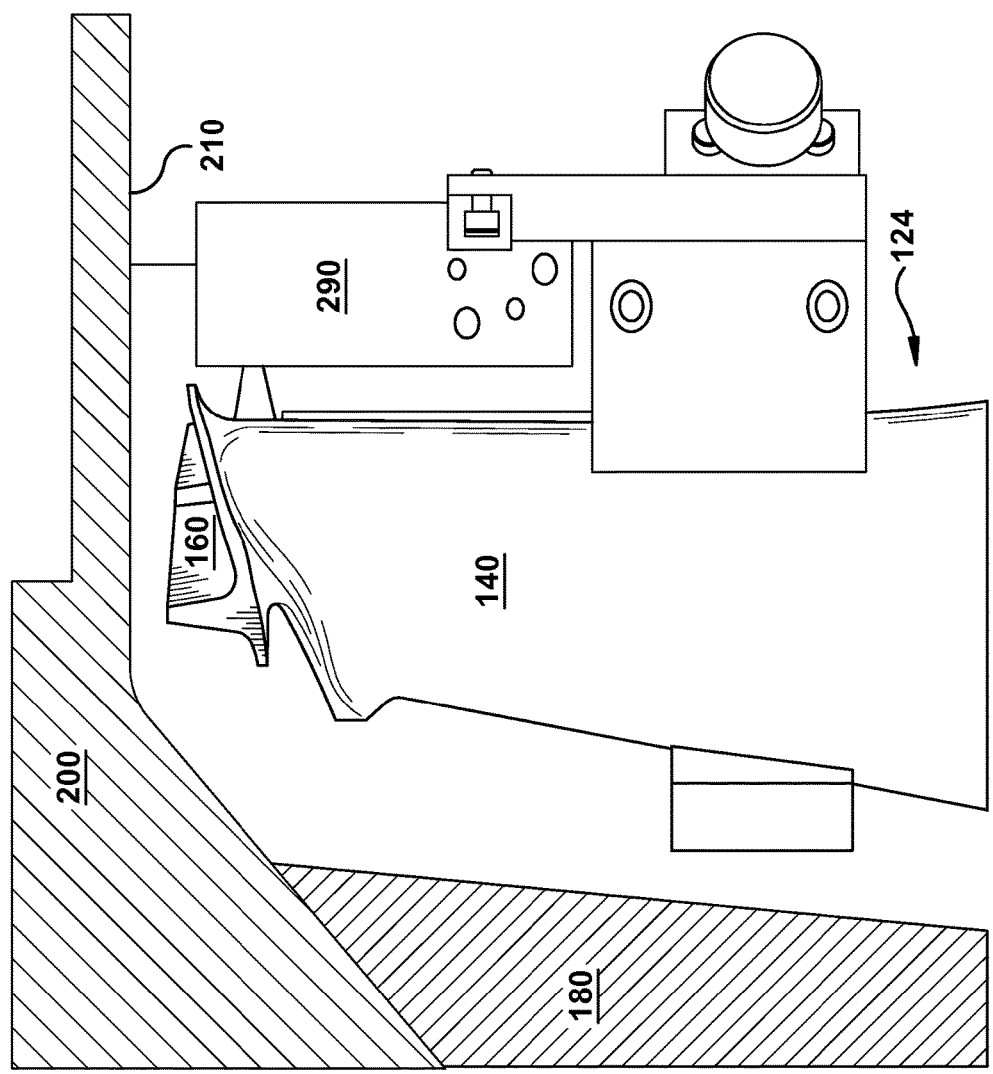
FIG. 13 is a perspective view of a laser measurement device in accordance with an embodiment of the invention.

As noted, clearance measurement points 260, 262, and therefore voltage drop sensors 300 and/or laser measurement devices 290 may be disposed at the tips of blades 140 or at the roots of nozzles 180 as shown in FIGS. 8, 11, and 13. In some embodiments, lower stator shell 240 may include at least one voltage drop sensor 300 and/or laser measurement device 290 inserted therein such that, e.g., voltage drop sensor 300 is embedded in lower stator shell 240 with a radially outer edge of voltage drop sensor 300 substantially flush with an inner surface 210 of the stator 200. In some embodiments, as shown in FIG. 6, voltage drop sensor 300 and/or laser measurement device 290 is located at a bottom dead-center position in the lower shell 240 of stator 200. In other embodiments, the voltage drop sensor 300 and/or laser measurement device 290 may be offset from a bottom dead center position by a margin of degrees which may be accounted for in calculations.

With continued reference to FIG. 6, in some embodiments, a computing device 350 may be provided, the computing device 350 being in signal communication with voltage drop sensor 300 and laser measurement device 290 via clearance sensor instrumentation leads 340 and/or wireless communication protocols.

Upon measuring a clearance 310 voltage drop sensor 300 and/or laser measurement device 290 may transmit a signal representing the voltage drop and/or clearance 310 to computing device 350. As shown in FIG. 6, computing device 350 includes a processor 346, a memory 352, and input/output (I/O) interfaces 348 operably connected to one another by pathway 354, which provides a communications link between each of the components in computing device 350. Further, computing device 350 is shown in communication with display 356, external I/O devices/resources 358, and storage unit 360. I/O resources/devices 358 can comprise one or more human I/O devices, such as a mouse, keyboard, joystick, numeric keypad, or alphanumeric keypad or other selection device, which enable a human user to interact with computing device 350 and/or one or more communications devices to enable a device user to communicate with computing device 350 using any type of communications link.

In general, processing unit 346 executes computer program code 362 which provides the functions of computing device 350. Modules, such as clearance calculator module 364, which is described further herein, are stored in memory 352 and/or storage unit 360, and perform the functions and/or steps of the present invention as described herein. Memory 352 and/or storage unit 360 can comprise any combination of various types of computer readable data storage media that reside at one or more physical locations. To this extent, storage unit 360 could include one or more storage devices, such as a magnetic disk drive or an optical disk drive. Still further, it is understood that one or more additional components not shown in FIG. 6 can be included in computing device 350. Additionally, in some embodiments one or more external I/O devices 358, display 356, and/or storage unit 360 could be contained within computing device 350, rather than externally as shown, in the form of a computing device 350 which may be portable and/or handheld.

Computing device 350 can comprise one or more general purpose computing articles of manufacture capable of executing program code, such as program 362, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 362 can be embodied as any combination of system software and/or application software.

Further, program 362 can be implemented using a module such as clearance calculator 364 or set of modules 366. In this case, calculator 364 can enable computing device 350 to perform a set of tasks used by program 362, and can be separately developed and/or implemented apart from other portions of program 362. As used herein, the term "component" means any configuration of hardware, with or without software, which implements the functionality described in conjunction therewith using any solution, while the term "module" means program code that enables a computing device 350 to implement the actions described in conjunction therewith using any solution. When fixed in memory 352 or storage unit 360 of a computing device 350 that includes a processing unit 346, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computing device 350.

When computing device 350 comprises multiple computing devices, each computing device can have only a portion of program 362 fixed thereon (e.g., one or more modules 364, 366). However, it is understood that computing device 350 and program 362 are only representative of various possible equivalent computer systems that may perform a process described herein. To this extent, in other embodiments, the functionality provided by computing device 350 and program 362 can be at least partially implemented by one or more computing devices that include any combination of general and/or specific purpose hardware with or without program code, including but not limited to a handheld measuring device for stator-to-rotor clearance. In each embodiment, the hardware and program code, if included, can be created using standard engineering and programming techniques, respectively.

When computing device 350 includes multiple computing devices, the computing devices can communicate over any type of communications link. Further, while performing a process described herein, computing device 350 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As noted, computing device 350 includes a clearance calculator module 364 for analyzing a signal provided by voltage drop sensor 300 and/or laser measurement device 290. Using a signal from voltage drop sensor 300 representing a voltage drop, or a clearance 310 measurement from laser measurement device 290, clearance calculator module 364 may calculate cold clearance 310.

Cold clearance 310 may be measured when turbomachine 100 is shutdown and cool. In further embodiments, rotor 120 may be rotated slowly, e.g., using an air motor, during measurement of clearance 310. This allows cold clearance 310 to account for any variations in clearance related to variations in the lengths of individual radially extending blades 140 on rotor 120 (FIG. 3). For example, rotor 120 may be rotated at a speed of about 0.25 to about 8 revolutions per minute (RPM).

Figure 14:
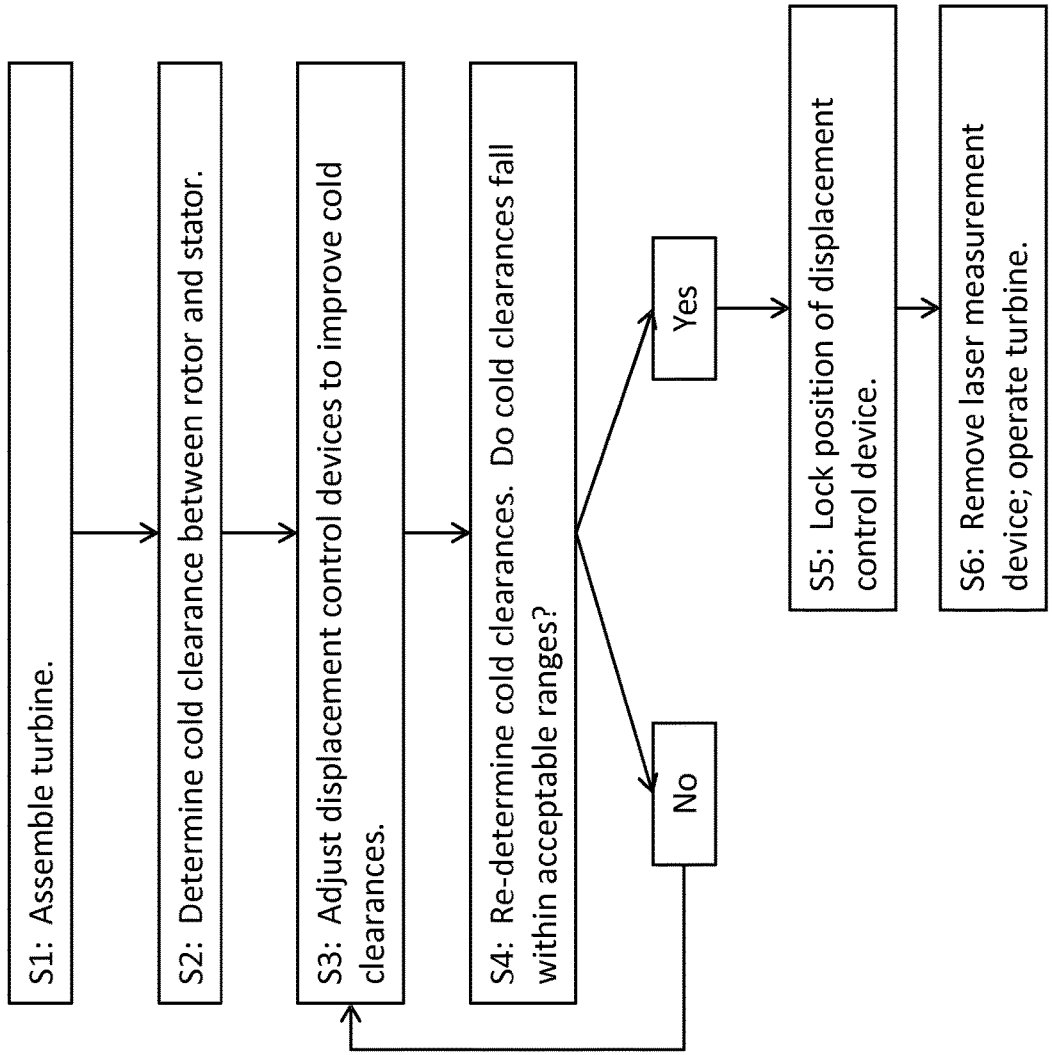
FIG. 14 is a flow chart depicting a method in accordance with an embodiment of the invention.

With reference to FIG. 14, a method is also provided for measuring and adjusting rotor to stator clearances in a fully assembled turbine.

In step S1, as described above with respect to FIG. 4, the turbine may be assembled by first assembling the lower stator shell to the foundation, followed by assembling the rotor. The upper stator shell may then be affixed to the lower stator shell such that the rotor is disposed within the stator, and rotates about a longitudinal axis thereof (FIG. 5).

In step S2, shown in FIG. 14, a cold clearance may be determined between a radially outermost point on rotor and an inner surface of the stator at each of a plurality of clearance measurement points using an in situ clearance sensor system. The rotor may be rotated slowly, e.g., at a speed of about 0.25 to about 8 revolutions per minute (RPM) using an air motor or other device while the cold clearances are determined at the plurality of clearance measurement points. Each of the clearance measurement points may be axially spaced from each other clearance measurement point. As discussed above, in some embodiments, the turbine may include between two and five clearance measurement points, for example.

The in situ clearance sensor system may include at least one voltage drop sensor inserted into either the upper or lower stator shell substantially aligned with a dry, or upstream stage of blades and a clearance measurement point. The voltage drop sensors may be positioned such that they may remain in place during eventual operation of the turbine. The in situ clearance sensor system may further include a laser measurement device removably affixed to a radially outer end of a rotor blade, at another clearance measurement point. In particular, the laser measurement device may be affixed to a rotor blade that is part of a final, wet stage of blades. The laser measurement device may be used to measure a tops-on clearance between the rotor blade tip and an inner surface of the stator while the upper stator shell, the rotor, and the lower stator shell are assembled together. The voltage drop sensors and the laser measurement device may communicate voltage drops and measurement data respectively to computing device 350, including clearance calculator module 364 as described above. Computing device 350 may calculate and in some embodiments display the determined cold clearance on a display. The laser measurement device may be wirelessly operated, and may be in communication via a wireless communication protocol with a computing device as discussed above.

In step S3, the cold clearance between the rotor and stator may be adjusted at each of the plurality of clearance measurement points based on the previously determined cold clearance at that location. In some embodiments, the adjusting may be performed using a displacement adjustment device to displace either the upper stator shell or the lower stator shell relative to the foundation. In particular, the relevant portion of the stator shell may be vertically displaced relative to the foundation. Since the foundation is substantially immobile, the vertical displacement of the stator shell results in the elastic deformation or distortion of the stator shell, as the displacement is translated to the stator shell. The change in shape of the upper and/or lower stator shell is done to accommodate the position of the rotor within the stator.

After adjusting the cold clearances between the rotor and stator, in step S4, the clearances may be re-determined at each of the plurality of clearance measurement points to confirm whether they are within acceptable bounds. If the re-determining indicates that the cold clearance does not meet a pre-determined threshold, the cold clearance between the rotor and the stator may be re-adjusted at each of the plurality of clearance measurement points. The re-adjusting may be performed using the displacement adjustment device as previously described to displace one or both of the upper stator shell or the lower stator shell relative to the foundation.

In step S5, after the displacement adjustment devices have been adjusted and the cold clearance has been deemed acceptable, the displacement adjustment devices may be locked. In some embodiments, the displacement adjustment devices may be one of a jacking screw, a set screw, or a fixator, and epoxy or cement may be applied to lock the position of the displacement adjustment device. In other embodiment, the displacement adjustment device may be a hydraulic cylinder or a pneumatic cylinder, and a valve may be closed to lock the displacement adjustment device in place, thereby preventing any further, unintentional displacement adjustment. In step S6, the laser measurement device may be removed after a final adjustment to the cold clearances is made.

As previously mentioned and discussed further herein, the system and method for adjusting turbomachine cold clearances, has the technical effect of enabling measurement and adjustment of cold clearances 310 between the rotor 120 and stator 200 in a turbomachine 100. Using the determined cold clearances 310 at each of a number of clearance measurement points 260, 262, adjustments to the vertical displacement of the upper and/or lower stator shells 220, 240 may be identified. Vertical displacement adjustments to points on either the upper or lower stator shell 220, 240 allows the stator 200 shell to be elastically deformed and distorted to accommodate the installed position of the rotor 120. These measurements and adjustments may be made after assembly of the lower stator shell 240, rotor 120, and upper stator shell 220, thus avoiding the need for time- and labor-intensive reiterative adjustments and re-installations. It is understood that some of the various components shown in FIG. 6 can be implemented independently, combined, and/or stored in memory for one or more separate computing devices that are included in computing device 350.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 6, or, more specifically, about 3 to about 6 sensors," is inclusive of the endpoints and all intermediate values of the ranges of "about 3 to about 6," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbomachine comprising:
   a rotor having a plurality of blade stages;
   a stator surrounding the rotor, the stator including a lower stator shell and an upper stator shell;
   an in situ clearance sensor system for determining a cold clearance between the rotor and the stator at each of a plurality of clearance measurement points, wherein each of the plurality of clearance measurement points is disposed at a position axially spaced from each other clearance measurement point,
   the in situ clearance sensor system including a plurality of voltage drop sensors, wherein a voltage drop sensor is disposed at each clearance measurement point in the plurality of clearance measurement points, and the voltage drop sensor at each clearance measurement point is embedded into one of the lower stator shell or the upper stator shell such that a radially outer edge of the voltage drop sensor is substantially flush with an inner surface of the upper or lower stator shell in which the voltage drop sensor is embedded,
   wherein the voltage drop sensor at each clearance measurement point is axially aligned with a rotor blade tip of an upstream stage of blades, and the voltage drop sensor is configured to measure a voltage drop across a clearance between a tip of the voltage drop sensor and the rotor blade tip; and
   a plurality of displacement adjustment devices axially spaced from each other, for displacing a position of one of the upper stator shell or the lower stator shell relative to a foundation and based on the clearance determined by the in situ clearance sensor system, thereby adjusting the cold clearance between the rotor and the stator.

2. The turbomachine of claim 1, wherein the in situ clearance sensor system further comprises a laser measurement device removably affixed to one of:
   a rotor blade in a final stage of blades, the laser measurement device being configured to measure a tops-on clearance between the tip of the rotor blade and the inner surface of the upper or lower stator shell while the upper stator shell, the rotor, and the lower stator shell are assembled together, or a nozzle ring or a nozzle cover, the laser measurement device being configured to measure a tops-on clearance between a radially inward tip of a nozzle and the rotor.

3. The turbomachine of claim 1, wherein the plurality of clearance measurement points further comprises between two and five axially spaced clearance measurement points.

4. The turbomachine of claim 1, wherein the plurality of displacement adjustment devices are disposed at a horizontal joint between the upper stator shell and the lower stator shell.

5. The turbomachine of claim 1, wherein at least one of the plurality of clearance measurement points is disposed on an underside of the lower stator shell.

6. The turbomachine of claim 1, wherein each of the displacement adjustment devices further comprises one of: a jacking screw, a set screw, or a fixator, and wherein each of the displacement adjustment devices further comprises a lock that is one of: an epoxy or a cement.

7. The turbomachine of claim 1, wherein each of the displacement adjustment devices further comprises one of a hydraulic cylinder or a pneumatic cylinder, and wherein each of the displacement adjustment devices further includes a valve for locking a position of the displacement adjustment device.

8. A method for adjusting rotor to stator clearances comprising:

assembling a turbomachine including a stator, the stator having a lower stator shell and an upper stator shell, and a rotor disposed within the stator;

determining a cold clearance between the rotor and the stator at each of a plurality of clearance measurement points using an in situ clearance sensor system, wherein each of the clearance measurement points is axially spaced from each other clearance measurement point, wherein determining the cold clearance further comprises using an in situ clearance sensor system that includes a plurality of voltage drop sensors, wherein a voltage drop sensor in the plurality of voltage drop sensors is embedded into one of the lower stator shell or the upper stator shell at each of the plurality of clearance measurement points, each voltage drop sensor being configured to measure a voltage drop across a clearance between a tip of the sensor and a rotor blade tip, wherein the voltage drop sensor is axially aligned with an upstream stage of blades; and adjusting the cold clearance between the rotor and the stator based on the determined cold clearances, the adjusting including: changing a shape of the upper stator shell or the lower stator shell by displacing one of the upper stator shell or the lower stator shell relative to a foundation to accommodate a position of the rotor within the stator.

9. The method of claim 8, further comprising:

after adjusting the cold clearance between the rotor and the stator, re-determining the cold clearance between the rotor and the stator at each of the plurality of clearance measurement points; and if the re-determining indicates that the cold clearance does not meet a pre-determined threshold, re-adjusting the cold clearance between the rotor and the stator, the re-adjusting including using a displacement adjustment device to displace one of the upper stator shell or the lower stator shell relative to the foundation based on the re-determined cold clearances, thereby changing the shape of the upper stator shell or the lower stator shell to accommodate the position of the rotor within the stator.

10. The method of claim 8, further comprising rotating the rotor within the stator at a speed of about 0.25 to about 8 revolutions per minute (RPM) while determining the cold clearances between the rotor and the stator at each of the plurality of clearance measurement points.

11. The method of claim 8, wherein determining the cold clearance further comprises using an in situ clearance sensor system that includes a laser measurement device removably affixed to one of:

a rotor blade in a final stage of blades, for measuring a tops-on clearance between the rotor blade tip and an inner surface of the stator while the upper stator shell, the rotor, and the lower stator shell are assembled together, or a nozzle ring or a nozzle cover, for measuring a tops-on clearance between a radially inward tip of a nozzle and the rotor.

12. The method of claim 11, further comprising: removing the laser measurement device from the rotor blade after a final adjustment is made.

13. The method of claim 8, wherein the adjusting further comprises adjusting a vertical position of the displacement adjustment device, wherein the displacement adjustment device includes one of: a jacking screw, a set screw, a fixator, a hydraulic cylinder, or a pneumatic cylinder.

14. The method of claim 13, further comprising: after adjusting the cold clearance between the rotor and the stator, locking a position of the displacement adjustment device.

15. A system for adjusting a rotor-to-stator clearance in a turbomachine, the system comprising:

an in situ clearance sensor system for determining a cold clearance between a rotor and a stator at each of a plurality of clearance measurement points, the stator including a lower stator shell and an upper stator shell, and the rotor being disposed within the stator, wherein the in situ clearance sensor system includes at least one voltage drop sensor inserted into one of the lower stator shell or the upper stator shell at a clearance measurement point, for measuring a voltage drop across a clearance between a tip of the voltage drop sensor and a rotor blade tip, and a computing device in signal communication with the voltage drop sensor, the computing device including a processor and a memory, the memory including instructions which when executed by the computing device, cause the computing device to determine a clearance between the rotor and the stator based on a signal representing the voltage drop;

a displacement adjustment device disposed on the stator, for displacing a position of one of the upper stator shell or the lower stator shell relative to a foundation and based on the determined clearance between the rotor and the stator, thereby adjusting the cold clearance between the rotor and the stator to a desired distance.

16. The system of claim 15, wherein the in situ clearance sensor system further comprises a laser measurement device removably affixed to one of:

a rotor blade in a final stage of blades, the laser measurement device being configured to measure a tops-on clearance between the a tip of the rotor blade and the inner surface of the upper or lower stator shell while the upper stator shell, the rotor, and the lower stator shell are assembled together, or a nozzle ring or a nozzle cover, for measuring a tops-on clearance between a radially inward tip of a nozzle and the rotor, wherein the laser measurement device is in signal communication with the computing device.

17. The system of claim 16, wherein the plurality of clearance measurement points further comprises between two and five axially spaced clearance measurement points.

18. The system of claim 16, wherein the displacement adjustment device includes one of: a jacking screw, a set screw, a fixator, a hydraulic cylinder, or a pneumatic cylinder, and wherein the displacement adjustment device includes a lock for fixing a position of the displacement adjustment device after the adjusting is completed.

* * * * *